Oct. 13, 1936.  E. KARFIOL  2,057,647
SHELF EDGING
Original Filed Nov. 7, 1935
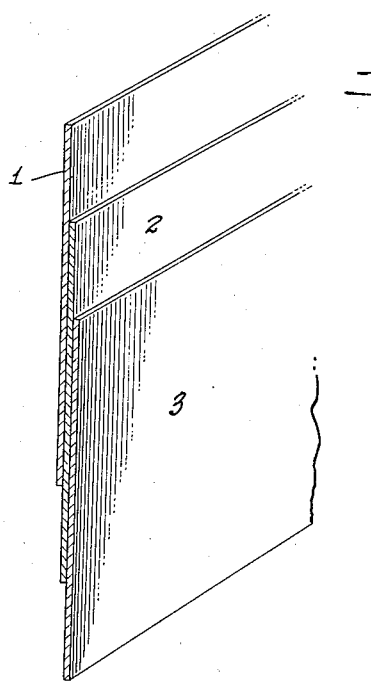
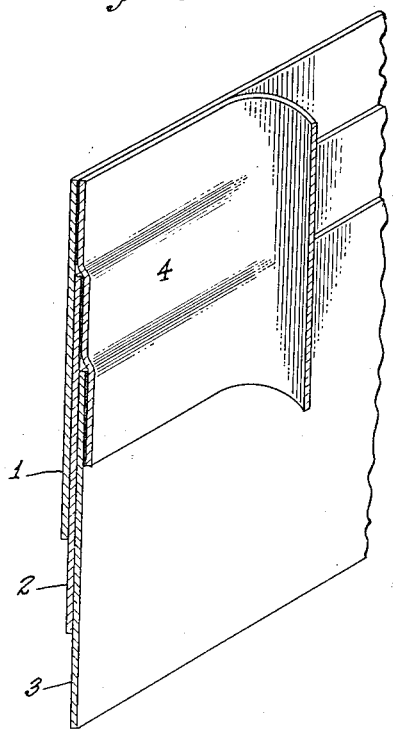
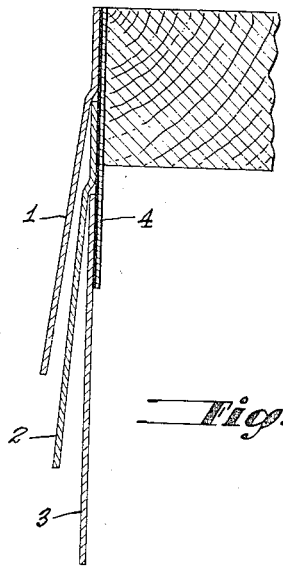
INVENTOR.
Edward Karfiol
BY
ATTORNEY.

Patented Oct. 13, 1936

2,057,647

UNITED STATES PATENT OFFICE 2,057,647

SHELF EDGING

Edward Karfiol, New York, N. Y.

Original application November 7, 1935, Serial No. 48,653. Divided and this application January 31, 1936, Serial No. 61,730

2 Claims. (Cl. 41—10)

This application is a division of application Serial No. 48,653, filed November 7, 1935 on "Shelf edging".

The invention relates to shelf edgings of the kind adapted to be secured to the front edges of pantry shelves and the like in order to impart a pleasing and decorative appearance thereto. Shelf edgings of the kind herein under consideration are adapted primarily to be made from paper and embody a plurality of plies, the edges of which may be scalloped or otherwise configurated, while the bodies of the respective plies may be of different colors or may be printed, lithographed or otherwise ornamented or may be embossed or perforated. The invention is directed, not to the particular ornamentation or shaping of the individual plies, but rather to the manner in which these plies are associated with one another.

The objects of the invention are to provide for economy in manufacture and for durability and economy in use. These objects are obtained by the particular manner in which several plies of the edging are so associated as to permit the use of plies in the form of relatively narrow strips, these strips being superimposed on one another after the manner of successive courses of shingles, so that each successively overlaps the next subjacent ply with one edge of each ply showing beneath the corresponding edge of the next ply, but with the opposite edges of the respective plies all concealed except the uppermost ply.

In this embodiment of the invention the said plies are backed up and secured to one another by an attaching strip overlying portions of the back of the several plies and secured to each of them so as to form the finished edging.

Features of the invention, other than those adverted to, will be apparent from the hereinafter detailed description and claims, when read in conjunction with the accompanying drawing.

The accompanying drawing illustrates one practical embodiment of the invention, but the construction therein shown is to be understood as illustrative, only, and not as defining the limits of the invention.

Figure 1 is a fragmental perspective view showing a plurality of plies of material arranged in consecutively overlapped relation and which plies so positioned form the basis of the edging of this invention.

Figure 2 shows the plies of Figure 1 united by an attaching strip which maintains it in assembled relation for use as an edging.

Figure 3 shows the section of an edging made in accordance with Figure 2 and applied to the edge of a shelf.

In making a shelf edging embodying the present invention, I start with a plurality of plies of material, such as paper, and I place them in the relative positions shown in Figure 1. Here three plies are shown although I may employ two or more of such plies, three being illustrative. The plies are, in fact, long strips of material arranged in face abutting relation and offset with respect to one another. That is to say, each is partially overlapped over the next ply. Thus, the ply 1 partially overlaps the next adjacent ply 2, while the ply 2 partially overlaps the third ply 3, but the width of these plies is such that only one marginal portion of each ply projects beyond the next ply. Thus, when viewing the assembly from either side, one facial ply is completely visible, while only marginal portions of the successive underlying plies are visible. In the following specification and claims, this arrangement will be referred to as an "overlapping" relation and this terminology is to be so construed, although it is not to be limited as referring to plies which are all of the same width or of an overlapping which is uniform for all plies, but rather to what may be graphically referred to as an echelon relation.

Starting with plies arranged as shown in Figure 1 and of a shape, size, configuration and ornamentation as may be desired, this basic structure may be manipulated in various ways to produce edgings of the character hereinafter described. The successive plies may be directly secured to one another, but I find it sufficient to unite the plies 1, 2 and 3 to form an edging by pasting to the back sides thereof an attaching strip 4, as shown in Figure 2. The strip 4 may be secured to the plies by applying adhesive to the margins of the several plies and thereafter securing the strip thereto or the adhesive may be deposited on the strip and the strip thereafter applied to the plies. In any event, the attaching strip will serve to secure the parts together and form a finished edging which may be attached to a shelf, as shown in Figure 3. Inasmuch as the front edge of a shelf is generally plane, the attachment of the edging to the shelf will tend to flatten the back face of the attaching strip 4 and cause the unglued portions of the plies 1 and 2 to be deflected forwardly somewhat, whereby they are caused to stand out slightly from the underlying plies and produce the desirable appearance of greater relief due to the resulting contrast of lights and shadows.

This form of edging is a highly economical form for it permits me to use very narrow strips which, when lapped, lend an aggregate depth to the edging which is materially greater than the width of any particular ply and since the attaching strip may be made of a cheap paper pronounced economies are thereby accomplished. The upper edge of the edging of Figures 2 and 3 may be finished off if desired with an appropriate binding, but this is not essential.

Having thus fully described the invention, what I claim as new and desire to secure by Letters Patent is:

1. Shelf edging in the running yard comprising a plurality of elongated strips arranged in overlapping relation transversely of their length with the lower marginal portion of each subjacent strip extending beyond the corresponding edge of the next superimposed strip and the upper marginal portion of each superimposed strip extending beyond the corresponding edge of the next subjacent strip, and an attaching ply overlying corresponding marginal facial portions of adjacent strips and adhesively secured, in face abutting relation, thereto.

2. Shelf edging in the running yard comprising a plurality of elongated strips arranged in overlapping relation transversely of their length with the successive strips secured together and with the lower marginal portion of each subjacent strip extending beyond the corresponding edge of the next superimposed strip and the upper marginal portion of each superimposed strip extending beyond the corresponding edge of the next subjacent strip, and an attaching ply overlying corresponding marginal facial portions of adjacent strips and adhesively secured, in face abutting relation thereto.

EDWARD KARFIOL.